(12) United States Patent
Evans et al.

(10) Patent No.: US 6,507,832 B1
(45) Date of Patent: Jan. 14, 2003

(54) USING INK TEMPERATURE GAIN TO IDENTIFY CAUSES OF WEB BREAKS IN A PRINTING SYSTEM

(75) Inventors: Robert Evans, Gallatin, TN (US); Did Bun Wong, Glen Ellyn, IL (US)

(73) Assignee: R.R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 09/354,261

(22) Filed: Jul. 15, 1999

Related U.S. Application Data

(63) Continuation-in-part of application No. 08/847,114, filed on May 1, 1997, now Pat. No. 6,009,421, which is a continuation-in-part of application No. 08/196,707, filed on Feb. 15, 1994, now Pat. No. 5,694,524.

(51) Int. Cl.[7] ............................................. G06N 5/02
(52) U.S. Cl. .................... 706/61; 706/60; 702/182; 702/185
(58) Field of Search ................ 356/430; 702/182, 702/185; 706/60, 61

(56) References Cited

U.S. PATENT DOCUMENTS

| | | | |
|---|---|---|---|
| 3,822,838 A | 7/1974 | Butler, Jr. et al. | 242/75.44 |
| 3,950,988 A | 4/1976 | Nowisch et al. | 73/144 |
| 4,130,014 A | 12/1978 | Eddens | 73/144 |
| 4,186,309 A | 1/1980 | Gnuechtel | 250/561 |
| 4,346,446 A * | 8/1982 | Erbstein et al. | 702/182 |
| 4,359,178 A | 11/1982 | Hayashi et al. | 226/25 |
| RE31,312 E | 7/1983 | Eddens | 73/862.48 |
| 4,532,500 A | 7/1985 | Henk | 340/675 |
| 4,716,978 A | 1/1988 | Wales et al. | 177/25 |
| 4,847,795 A | 7/1989 | Baker et al. | 364/579 |
| 4,975,865 A | 12/1990 | Carrette et al. | 364/153 |
| 5,006,992 A | 4/1991 | Skeirik | 364/513 |
| 5,036,706 A | 8/1991 | Gnbuechtel et al. | 73/597 |
| 5,121,467 A | 6/1992 | Skeirik | 395/11 |
| 5,131,074 A | 7/1992 | Nakamura et al. | 395/61 |

(List continued on next page.)

OTHER PUBLICATIONS

Bareiss et al., Supporting Start–to–Finish Development of Knowledge Bases, 4 Machine Learning, pp.. 259–283 (1989).
Clark et al., The CN2 Induction Algorithm, 3 Machine Learning, pp. 261–283 (1989).
Kasunich et al., Gravure Process and Technology, Chs. 4, 6–9, 11–13, 15, pp. 37–64, 99–241, 259–362, 379–398 (Brett Rutherfored ed. 1991).
Draper, Assessment and Propagation of Model Uncertainty, (draft version) in Proceedings of the Fourth International Workshop on Artificial Intelligence and Statistics, pp. 497–509 (1993).
Edelstein, *Mining for Gold,* 6 pgs. (Apr. 21, 1997).
Simoudis, Reality Check for Data Mining, IEEE Expert, pp. 25–33 (Oct. 1996).

(List continued on next page.)

*Primary Examiner*—Wilbert L. Starks, Jr.
(74) *Attorney, Agent, or Firm*—Marshall, Gerstein & Borun

(57) ABSTRACT

A device that determines conditions under which a web break is more likely to occur in a printing system stores data pertaining to ink temperature or ink temperature gain. The device then implements a correlation analysis, such as a decision-tree induction analysis, using the stored data to determine if there is a correlation between the one or more attributes and the occurrence of a web break. The device has a multiplicity of ink fountains and includes a first temperature sensor that measures a first ink temperature and a second temperature that measures a second ink temperature. A controller compares the first ink temperature to the second ink temperature to determine an ink temperature gain, compares the ink temperature gain to a desired ink temperature gain range and generates an output signal based on the comparison.

30 Claims, 10 Drawing Sheets

U.S. PATENT DOCUMENTS

| | | | |
|---|---|---|---|
| 5,136,686 A | 8/1992 | Koza ............................ | 395/13 |
| 5,167,009 A | 11/1992 | Skeirik ......................... | 395/27 |
| 5,175,797 A | 12/1992 | Funabashi et al. ............. | 395/22 |
| 5,188,028 A | 2/1993 | Reichel ....................... | 101/228 |
| 5,197,115 A | 3/1993 | Sueda et al. ................... | 395/50 |
| 5,245,698 A | 9/1993 | Matsunaga .................... | 395/61 |
| 5,267,141 A | 11/1993 | Morita et al. ............... | 364/152 |
| 5,269,222 A | 12/1993 | Johnson et al. .............. | 101/228 |
| 5,282,261 A | 1/1994 | Skeirik ......................... | 395/22 |
| 5,301,866 A | 4/1994 | Veh et al. ...................... | 226/11 |
| 5,325,774 A | 7/1994 | Breton et al. ............... | 101/228 |
| 5,357,812 A | 10/1994 | Kübert et al. ................. | 73/862 |
| 5,365,796 A | 11/1994 | Lin et al. ...................... | 73/862 |
| 5,365,844 A | 11/1994 | Miyashige ................... | 101/228 |
| 5,378,918 A | 1/1995 | Öttl ............................ | 250/571 |
| 5,402,524 A | 3/1995 | Bauman et al. ............... | 395/50 |
| 5,412,757 A | 5/1995 | Endo ........................... | 395/61 |
| 5,414,798 A | 5/1995 | Nigawara et al. ............. | 395/75 |
| 5,434,955 A | 7/1995 | Kumamoto ................... | 395/51 |
| 5,521,844 A * | 5/1996 | Karis ........................ | 702/185 |
| 5,541,832 A | 7/1996 | Nakajima et al. ........... | 364/148 |
| 5,594,836 A | 1/1997 | Ryu et al. ...................... | 395/62 |
| 5,694,524 A | 12/1997 | Evans ........................ | 395/77 |
| 5,850,339 A | 12/1998 | Giles .......................... | 364/148 |
| 5,949,550 A * | 9/1999 | Arndt et al. ................. | 356/430 |
| 6,009,421 A * | 12/1999 | Xie et al. ...................... | 706/61 |
| 6,098,063 A * | 8/2000 | Xie et al. ...................... | 706/60 |

OTHER PUBLICATIONS

Buntine, Operations on Counting Tables, Turing Institute, pp. 1–4 (Oct. 1989).

Buntine, Review and Questions on Learning Decision Trees, Turing Institute, pp. 1–6 (Oct. 1989).

Chou, Optimal Partitioning for Classification and Regression Trees, 13 IEEE Transactions on Pattern Analysis and Machine Intelligence, pp. 340–354 (1991).

Buntine, Learning Classification Trees, RIACS & NASA Ames Research Center, pp. 1–25 (Nov. 1991).

Oliver, Decision Graphs—An Extension of Decision Trees, (Draft), Monash University, Australia, pp. 1–13 (Dec. 15, 1992).

Buntine et al., Introduction to IND Version 2.1 and Recursive Partitioning, IND User's Manual, NASA Ames Research Center, Dec. 31, 1992 (including a one page summary of IND Version 2.0 and a two page summary of modifications to IND Versions 0.1 to 2.1).

Buntine, Tree Classification Software, presented at The Third National Technology Transfer Conference and Exposition, Baltimore, pp. 1–10 (Dec. 1992).

W.F. Punch III ed., New NASA Software, Expert New Products, p. 97 (Aug. 1993).

XpertRule® Analyser™ Knowledge from Data, User's Guide (Release 2), published by Attar Software (1994).

ANGOSS KnowledgeSEEKER, Version 3.0, User's Guide, published by ANGOSS Software Intl., Ltd. (1984–1994).

Buntine, *Recursive Partitioning Skeleton Code*, pp. 1–2 (1990).

*Recursive Partitioning Skeleton Code*, pp. 1–2 (1990).

Michalski et al., Learning by Being Told and Learning From Examples: An Experimental Comparison of the Two Methods of Knowledge Acquisition in the Context of Developing an Expert System for Soybean Disease Diagnosis, 4 International Journal of Policy Analysis and Information Systems 125–161 (1980).

Musen, Automated Support for Building and Extending Expert Models, 4 Machine Learning 347–375 (1989).

Shannon et al., *The Mathematical Theory of Communication*, pp. 1–5, 30–64 (1963).

Tan et al., Two Case Studies in Cost–Sensitive Concept Acquisition, in Proceedings of the Eighth National Conference on Artificial Intelligence, 854–860 (1990).

Walsh, *Handbook of Nonparametric Statistics*, pp. 10, 50, 194–195, 290, 300 (1962).

Weiss et al. *Computer Systems that Learn*, Chs. 5–7, pp. 113–203 (1991).

Anderson, *The Adaptive Character of Thought*, pp. 1, 5–40 (1990).

Fayyad et al., On the Handling of Continuous–Valued Attributes in Decision Tree Generation, 8 Machine Learning, pp. 87–102 (1992).

Mantaras, A Distance–Based Attribute Selection Measure for Decision Tree Induction, 6 Machine Learning, pp. 81–92 (1991).

Padalkar et al., Real–Time Fault Diagnostics, IEEE Expert 75–85 (Jun. 1991).

Quinlan, Induction of Decision Trees, 1 Machine Learning, pp. 81–106 (1986).

Shavlik et al., Symbolic and Neural Learning Algorithms: An Experimental Comparison, 6 Machine Learning, pp. 111–143 (1991).

Smith et al., *Categories and Concepts*, Chs. 1, 2, 8, pp. 1–21, 162–182 (1981).

Weiss et al., An Empirical Comparison of Pattern Recognition, Neural Nets, and Machine Learning Classification Methods, Proceedings of the Eleventh International Joint Conference on Artificial Intelligence, pp. 781–787 (1989).

Fisher, Knowledge Acquisition Via Incremental Conceptual Clustering, 2 Machine Learning, pp. 139–172 (1987).

Rich, *Artificial Intelligence*, (1983).

Mingers, An Empirical Comparison of Pruning Methods for Decision Tree Induction, 4 Machine Learning, pp. 227–243 (1989).

Whitehall et al., CAO: A Machine Learning Tool for Engineering, vol. 5, No. 4, Artificial Intelligence in Engineering, pp. 189–198 (1990).

Schlimmer, Incremental Adjustment of Representations for Learning, Proceedings of the Fourth International Workshop on Machine Learning, pp. 79–90 (1987).

Lu et al., A Machine Learning Approach to the Automatic Synthesis of Mechanistic Knowledge for Engineering Decision–Making, 1 AI EDAM, pp. 109–118 (1987).

Buntine et al., Interactive Induction, 12 Machine Intelligence 121–137 (Hayes–Michie et al. eds. 1990).

Clark et al., Using Qualitative Models to Guide Inductive Learning, Proceedings of the Tenth International Machine Learning Confernece, pp. 49–56 (1993).

Irani et al., Applying Machine Learning to Semiconductor Manufacturing, IEEE Expert, pp. 41–47 (1993).

Quinlan, C4.5: Programs for Machine Learning (1991).

Kerber, ChiMerge: Discretization of Numeric Attributes, Proceedings of the Tenth National Conference on Artificial Intelligence, pp. 123–127 (1992).

Porter et al., Concept Learning and Heuristic Classification in Weak–Theory Domains, 45 Artificial Intelligence, pp. 229–263 (1990).

Evans, An Application of ID3 Using Real Valued Features, (1991).

Evans et al., Overcoming Process Delays with Decision Tree Induction, IEEE Expert, pp. 60–66 (1994).

Brochure by Integral Solutions Limited, ISL—Rules—A Powerful Tool for Generating Embeddable Rules (1989).

Letter to applicant from Integral Solutions Limited, dated Apr. 27, 1992.

Letter to applicant from Infolink Decision Services Limited, dated Jan. 27, 1994.

Integral Solutions Limited, *Catalyst Catalog,* p. 47 (1991).

Wang et al., A Brain Tumor Diagnostic System with Automatic Learning Abilities, Proceedings of Third Annual IEEE Symposium on Computer–Based Medical Systems, pp. 313–320 (Jun. 1990).

* cited by examiner

USING INK TEMPERATURE GAIN TO IDENTIFY CAUSES OF WEB BREAKS IN A PRINTING SYSTEM

RELATED APPLICATION

This is a continuation-in-part of U.S. patent application Ser. No. 08/847,114, which issued as U.S. Pat. No. 6,009,421 filed May 1, 1997, which is a continuation-in-part of U.S. patent application Ser. No. 08/196,707, filed Feb. 15, 1994, which issued as U.S. Pat. No. 5,694,524 on Dec. 2, 1997.

TECHNICAL FIELD

The present invention relates generally to printing systems and more particularly to a method and device that identifies conditions leading to, and that decreases the occurrence of, web breaks within a printing system.

BACKGROUND ART

Large-scale printing systems, such as rotogravure printing presses, feed a continuous web of material, typically paper, through printing machinery that forces the web into contact with one or more rotogravure printing cylinders which, in turn, print images onto the web in a standard manner. Thereafter, the web is cut into individual pages or signatures which are collated to produce newspapers, books, magazines, etc. A common and recurring problem in large-scale printing systems is the occurrence of web breaks, which happen when the web tears while the web is being fed through the individual components of the printing system. Upon the occurrence of a web break, the printing system must be shut down, the torn web must be dislodged from the individual components of the printing system and then the web must be re-fed through the printing system, all of which takes a considerable amount of time and results in wasted paper and ink. Furthermore, in some instances, web breaks may result in damage to components of the printing system.

While web breaks are a common problem in the printing industry, the reasons or conditions that lead to the occurrence of any particular web break vary widely. In fact, web breaks may be caused by different factors or by different combinations of factors at different times in the same printing system. Generally, web breaks are avoided by having a local expert, such as a printing press foreman, oversee the press conditions and make suggestions for changes based mainly on past experiences with web breaks, trial and error and general rules of thumb. While some of these approaches are successful in decreasing the incidence of web breaks in the short term, web breaks usually reappear later with very little indication as to the real cause of the reappearance. Furthermore, while local printing experts are usually capable of determining the general cause of any particular web break after the web break has occurred and, moreover, are generally capable of altering press conditions to eliminate a particular cause of a web break in the short term, there is no guarantee that the altered conditions will not result in further web breaks for other reasons or that the press conditions suggested by the local expert will be implemented in the press for a long period of time.

It has been suggested to use an expert system to determine the causes of problems, such as web breaks, within a printing system. In particular, the above-identified parent application, which issued as U.S. Pat. No. 5,694,524 on Dec. 2, 1997, on which this application relies for priority, is directed to the use of a decision-tree induction analysis that identifies conditions leading to a particular result, such as web breaks, within a printing system. In general, expert systems are used to mimic the tasks of an expert within a particular field of knowledge or domain, or to generate a set of rules applicable within the domain. In these applications, expert systems must operate on objects associated with the domain, which may be physical entities, processes or even abstract ideas. Objects are defined by a set of attributes or features, the values of which uniquely characterize the object. Object attributes may be discrete or continuous.

Typically, each object within a domain also belongs to or is associated with one of a number of mutually exclusive classes having particular importance within the context of the domain. Expert systems that classify objects from the values of the attributes for those objects must either develop or be provided with a set of classification rules that guide the system in the classification task. Some expert systems use classification rules that are directly ascertained from a domain expert. These systems require a "knowledge engineer" to interact directly with a domain expert in an attempt to extract rules used by the expert in the performance of his or her classification task.

Unfortunately, this technique usually requires a lengthy interview process that can span many man-hours of the expert's time. Furthermore, experts are not generally good at articulating classification rules, that is, expressing knowledge at the right level of abstraction and degree of precision, organizing knowledge and ensuring the consistency and completeness of the expressed knowledge. As a result, the rules that are identified may be incomplete while important rules may be overlooked. Still further, this technique assumes that an expert actually exists in the particular field of interest. Even if an expert does exist, the expert is usually one of a few and is, therefore, in high demand. As a result, the expert's time and, consequently, the rule extraction process can be quite expensive.

It is known to use artificial intelligence within expert systems for the purpose of generating classification rules applicable to a domain. For example, an article by Bruce W. Porter et al., *Concept Learning and Heuristic Classification in Weak-Theory Domains*, 45 Artificial Intelligence 229–263 (1990), describes an exemplar-based expert system for use in medical diagnosis that removes the knowledge engineer from the rule extraction process and, in effect, interviews the expert directly to determine relevant classification rules.

In this system, training examples (data sets that include values for each of a plurality of attributes generally relevant to medical diagnosis) are presented to the system for classification within one of a predetermined number of classes. The system compares a training example with one or more exemplars stored for each of the classes and uses a set of classification rules developed by the system to determine the class to which the training example most likely belongs. A domain expert, such as a doctor, either verifies the classification choice or instructs the system that the chosen classification is incorrect. In the latter case, the expert identifies the correct classification choice and the relevant attributes, or values thereof, that distinguish the training example from the class initially chosen by the system. The system builds the classification rules from this information, or, if no rules can be identified, stores the misclassified training example as an exemplar of the correct class. This process is repeated for training examples until the system is capable of correctly classifying a predetermined percentage of new examples using the stored exemplars and the developed classification rules.

A patent to Karis (U.S. Pat. No. 5,521,844) discloses a case-based expert system that may be used to aid in the identification of the cause of a particular problem, such as a web break, in a printing system. The expert system disclosed in the Karis patent stores data related to a set of previous printing runs or cases in which the problem, e.g., a web break, actually occurred. An expert then goes through the cases and identifies the most likely reason or reasons that the problem occurred in each case. These reasons are then stored in the memory of the expert system and, thereafter, the stored cases, along with the cause and effect reasoning provided by the expert are used to classify the cause(s) of the problem when it arises later. Unfortunately, the Karis system requires the use of an expert to originally identify the most probable cause(s) of the problem and, thus, is totally dependent on the expert's knowledge and reasoning. The Karis system does not identify causes that were never identified by the expert because, for example, the expert did not connect the problem to a particular cause or because the cause did not result in the problem in one of the cases reviewed by the expert. Furthermore, the Karis system does not store or collect data pertaining to printing runs in which the problem did not occur. As a result, the Karis system cannot perform a data mining technique, i.e., one in which causes are determined based on the data from both printing runs in which the problem did occur and printing runs in which the problem did not occur.

Other artificial intelligence methods that have been used in expert systems rely on machine induction in which a set of induction rules are developed or are induced directly from a set of records, each of which includes values for a number of attributes of an object and an indication of the class of the object. An expert then reviews the induced rules to identify which rules are most useful or applicable to the classification task being performed. Such a system is disclosed in the above-identified parent patent. This method has the advantage of using the expert in a way that the expert is accustomed to working, that is, identifying whether particular rules are relevant or useful in the classification task. It should be noted, however, that all of the relevant attributes of the objects being classified must be identified and data for those attributes must be provided within the records in order for the system to induce accurate and complete classification rules.

A classic example of a pure machine induction technique is described in an article by J. R. Quinlan, *Induction of Decision Trees*, 1 Machine Learning 81–106 (1986). This technique searches through relations between combinations of attribute values and classes of objects to build an induction tree which is then used to generate precise classification rules. During operation, the Quinlan method calculates a statistical measurement, referred to as an information gain value, for each of a set of attributes and chooses the attribute with the highest information gain value at a root of the tree. The attribute values associated with the chosen attribute are then identified as nodes of the tree and are examined. If all of the data records associated with a node are all of the same class, the node is labeled as a leaf or endpoint of the induction tree. Otherwise, the node is labeled as a branching point of the induction tree. The method then chooses a branching point, calculates the information gain value for each of the remaining attributes based on the data from the records associated with the chosen branching point, chooses the attribute with the highest information gain value and identifies the attribute values of the chosen attribute as nodes which are examined for leaves and branching points. This process may be repeated until only leaves remain within the induction tree or until, at any existing branching point, there are no attributes remaining upon which to branch. After an induction tree is constructed, classification rules are generated therefrom by tracing a path from a particular leaf of the induction tree to the root of the induction tree or vice versa.

As noted above, choosing the appropriate variables or attributes for such an expert system is an important step in identifying the cause of a problem such as web breaks. Without the appropriate choice of attributes, the expert system can be practically useless in actually determining the causes of problems such as web breaks in a printing system.

SUMMARY OF THE INVENTION

The present invention is directed to a system that identifies conditions leading to web breaks within a printing system based on ink temperature gain. The device or method described herein may alert a user to the fact that a condition that is likely to result in a web break exists and/or may automatically control the printing system to prevent or eliminate a condition that is likely to result in a web break.

The present invention is a device or method that determines conditions under which a break in a web of a printing system having a multiplicity of ink fountains is more likely to occur. A database that stores data related to temperatures of ink in a first and second of the multiplicity of ink fountains for each of a plurality of printing runs of the printing system, wherein a web break occurred in some of the plurality of printing runs and did not occur in others of the plurality of printing runs and a processor determines if there is a correlation between the stored data and the occurrence of web breaks in the printing system.

The device and method may measure a first ink temperature of a first ink in a first ink fountain of the printing system, a second ink temperature of a second ink in a second ink fountain of the printing system, compare the first ink temperature to the second ink temperature to determine an ink temperature gain. Thereafter, ink temperature gain may be compared to a desired ink temperature gain range and an output signal may be generated based on the comparison of the ink temperature gain and the desired ink temperature gain range.

In another aspect of the present invention, a system for reducing web breaks in a printing system having a multiplicity of ink fountains includes a first temperature sensor that measures a first ink temperature of a first ink in a first ink fountain of the printing system and a second temperature sensor that measures a second ink temperature of a second ink in a second ink fountain of the printing system. A controller compares the first ink temperature to the second ink temperature to determine an ink temperature gain, compares the ink temperature gain to a desired ink temperature gain range and generates an output signal based on the comparison of the ink temperature gain and the desired ink temperature gain range.

DESCRIPTION OF THE PREFERRED EMBODIMENT

Figure 1:
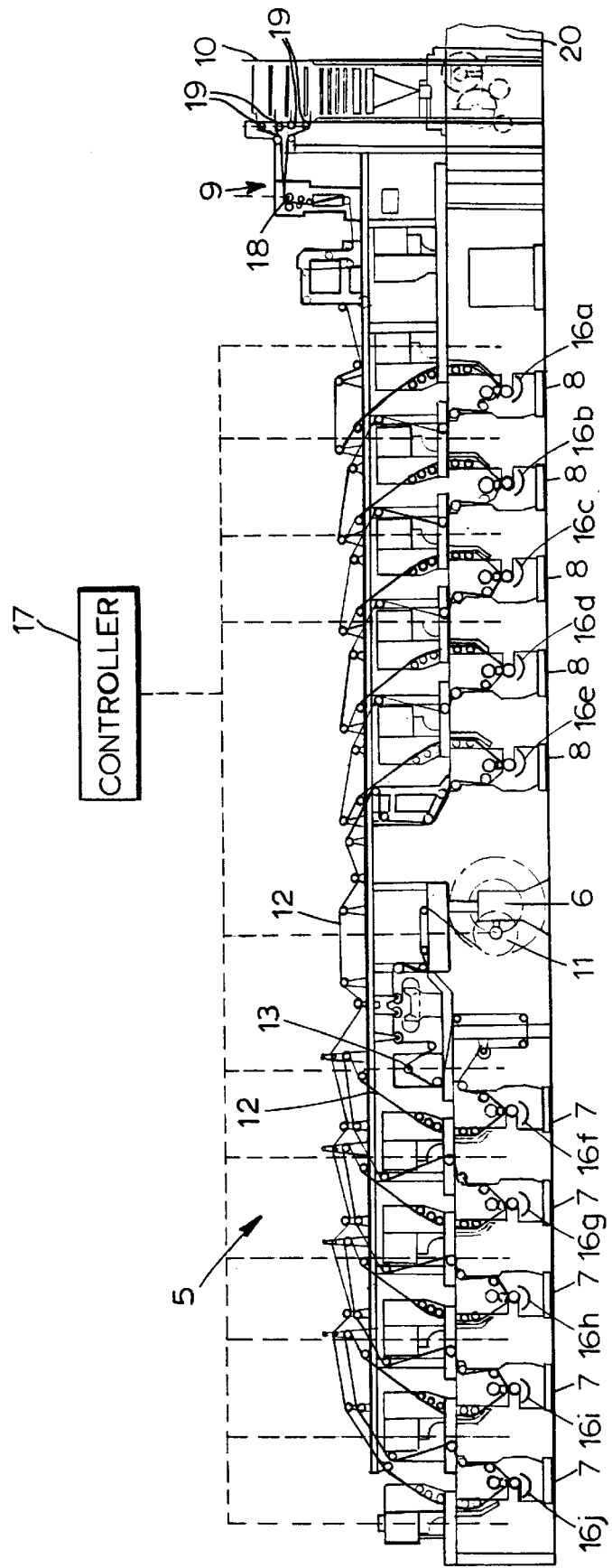
FIG. 1 is a partial block and partial schematic diagram of a printing system having a controller therein.

Referring now to FIG. 1, a standard printing system 5, which may be a rotogravure printing press, includes a reel support 6, various printing stations 7 and 8, a ribbon cutter 9 and a folder/cutter 10. A reel 11 having a web 12 made of, for example, paper, is mounted on the reel support 6 and is driven to feed the web 12 over an infeed roller 13, through the printing stations 7, which print an image on one side of the web 12, back over the printing stations 7 and the reel 11 and then through the printing stations 8, which print an image on the other side of the web 12. Preferably, there are five printing stations 7 and 8 for each side of the web 12. Each of the printing stations 7 and 8 includes printing cylinders that print one of cyan, magenta, yellow or key (black) ink onto the web 12 or that print type onto the web 12. Each printing cylinder has an associated ink fountain 16a-16j that contains ink to be used during printing.

After being delivered through the printing stations 7 and 8, the web 12 is delivered over a drag roller 18 and is then cut along the length thereof by the ribbon cutter 9 into, for example, four ribbons of equal width. Each of the ribbons is fed over or around a ribbon roller 19 and is then compiled or stacked with the other ribbons in the folder/cutter 10. Thereafter, the stacked ribbons are cut along the width thereof to form a set of pages or signatures, that are folded into a book which, in turn, is delivered to a mail table 20 for delivery to a customer, all as generally known in the art.

During operation of the printing system 5, power is applied to the reel 11, to the infeed roller 13, to the drag roller 18 and to the ribbon rollers 19 to control movement of the web 12 through the printing system 5. Of course, to assure that power is transferred to the web 12 at these locations, the web 10 is held taught against these rollers which, in turn, creates a tension in the web 12 at these locations. In particular, the reel 11 applies a reel tension to the web 12 as it leaves the reel 11, the infeed roller 13 applies an infeed tension to the web 12 passing thereover, the drag roller 18 applies a drag tension to the web 12 and each of the ribbon rollers 19 applies a ribbon tension to a portion of the web 12. As is known, load cells may be located on each of the reel 11, the infeed roller 13, the drag roller 18 and the ribbon rollers 19 to measure the tension on the web 12 at these locations.

As the printing system 5 operates, the ink temperature in each ink fountain 16a–16j changes due to, for example, frictional forces. As the ink temperature increases, the printing cylinders increase in diameter and, therefore, the tension on the web 12 increases. Ink temperature gain of the printing system 5, which is the ink temperature differential between any two or more ink fountains 16a–16j, may change during printing system operation. Ink temperature gain for the printing system 5 may be measured between any number of ink fountains 16a–16j. For example, ink temperature gain may be measured between two consecutive ink fountains (e.g., 16a and 16b) or between any two non-consecutive ink fountains (e.g., 16a and 16i). Additionally, ink temperature gain may be measured through a series of ink fountains (e.g., the first ink fountain 16a through each succeeding ink fountain 16b, 16c, 16d, etc. to the last ink fountain 16j). When ink temperature gain is measured through a series of ink fountains (e.g., 16a–16j), the ink temperature gain between consecutive ink fountains (e.g., 16a–16j) is summed to compute the ink temperature gain between all of the ink fountains 16a–16j. When ink temperature between consecutive ink fountains decreases, a zero is added to the sum. For example, if the ink in the first fountain 16a is 100 degrees, the ink in the second fountain 16b is 110 degrees, the ink in the third fountain 16c is 115 degrees, and the ink temperature in the fourth ink fountain 16d is 105 degrees, the ink temperature gain from the first ink fountain 16a through the fourth ink fountain 16d is the sum of the differences between the ink temperatures of consecutive fountains (i.e., the ink temperature gain is [110–100]+[115–110]+[0] =15 degree Each ink fountain 16a–16j is fitted with an ink temperature probe to measure the ink temperature. Ink temperature probes are communicatively coupled to a controller 17.

Before now, there has been no recognition that controlling ink temperatures or ink temperature gains within a printing system can reduce web breaks. It has been discovered, however, that web breaks in printing systems are correlated with ink temperature gains within those printing systems and, more particularly, that the temperature gain between successive ink fountains 16a, 16b, 16c, etc. can be used as an indication when a web break is more likely to occur within a printing system. As a result, web breaks may be reduced in the printing system 5 of FIG. 1 by controlling ink temperature or ink temperature gains to remain at one or more values or ranges that have been predetermined as values or ranges at which web breaks are less likely to occur within the printing system 5.

To reduce web breaks based on ink temperature gain, the controller 17, which may be any standard printing system controller including, for example, any analog, digital, hard-wired processor or microprocessor, is connected to the ink temperature probes within the ink fountains 16a–16j to receive indications of the ink temperature in each of those fountains. The controller 17 then calculates the ink temperature gain between any two ink fountains and compares this gain to a predetermined value or range to determine if the calculated ink temperature gain is at the predetermined value or is within the predetermined range. If the calculated ink temperature gain is not at the predetermined value or within the predetermined range, the controller 17 generates an alarm or other output signal indicating this fact. The output signal may, for example, alert a user via any alarm, such as a bell, a whistle, a display device (such as a CRT, a flashing light, etc.) or any other display to indicate that the ink temperatures of one or more of the ink fountains 16a–16j should be adjusted to force the ink temperature gain back to the predetermined value or back within the predetermined range. Of course, the controller 17 may measure any number of different temperatures, may calculate any desired number of different ink temperature gains based on those measurements, may compare those ink temperature gains with different ink temperature gain values or ranges and may alert a user when one or more of the calculated ink temperature gains falls outside of a predetermined value or range.

If desired, the controller 17 may be connected to, for example, ink heaters or ink chillers (not shown) within the printing system 5. The controller 17 may then generate an output signal to automatically increase or decrease the ink temperature at one or more of the ink fountains 16a–16j to force the ink temperatures or the calculated ink temperature gain(s) back to its (their) respective predetermined value(s) or back within its (their) respective predetermined range(s).

In this manner, the controller 17 operates to reduce the occurrence of future web breaks based on one or more ink temperatures or calculated ink temperature gains.

In a particular embodiment, it has been discovered advantageous to keep the ink temperature gain between 0 and 15 degrees. Of course, this range may change depending upon the type of ink or web being used, and the type of printing system being controlled as well as other factors specific to the individual printing system/web combination.

Thus, as will be understood, the particular ink temperature gain or gains that lead to reduced web breaks within the printing system 5 may differ for different printing systems and may, in fact, differ for different conditions within any individual printing system, because, for example, different types of web materials are used within that printing system. As a result, it is advisable to identify the particular predetermined ink temperature gain value or range that is appropriate for reducing web breaks in each different printing system. While such ink temperature gain values or ranges may be determined by, for example, trial and error methods or any other desired method, an appropriate ink temperature gain value and/or range is preferably determined from data indicating relevant ink temperatures or ink temperature gains for prior runs of the printing system 5 in which both web breaks occurred and web breaks did not occur.

Thus, according to a preferred embodiment, a database, which may be located in the controller 17 or elsewhere, stores data indicating ink temperatures or ink temperature gains for a plurality of printing runs along with an indication of whether a web break occurred or did not occur at those ink temperatures or ink temperature gains within each of the plurality of printing runs. Typically, a printing run in this context is defined by printing associated with one entire reel 11, i.e., printing associated with each reel 11 loaded onto the reel stand 6 of the printing system 5. Thereafter, any desired method of identifying a proper ink temperature gain value or range that results in reduced web breaks based on the stored data may be used. Such methods may include the use of any correlation analysis, for example, a neural network, an expert system, etc. However, a preferred method of identifying one or more proper ink temperature gain values or ranges that result in reduced web breaks uses a decision tree-induction correlation analysis and will be described below.

If desired, the correlation analysis may be performed using various printing attribute data, such as the ink temperature data discussed above, to determine if a correlation between any combination of these attributes results in an increased or decreased occurrence of web breaks. Of course, when a particular correlation between one or a combination of two or more attributes is identified, this correlation may be displayed via a printer, a monitor, or other display device and may be used to control the printing system to avoid occurrence of web breaks. Furthermore, when a correlation between ink temperature gain and web breaks (or other problems) is identified, the ink temperatures in the system may be modified to reduce web breaks.

Figure 2:
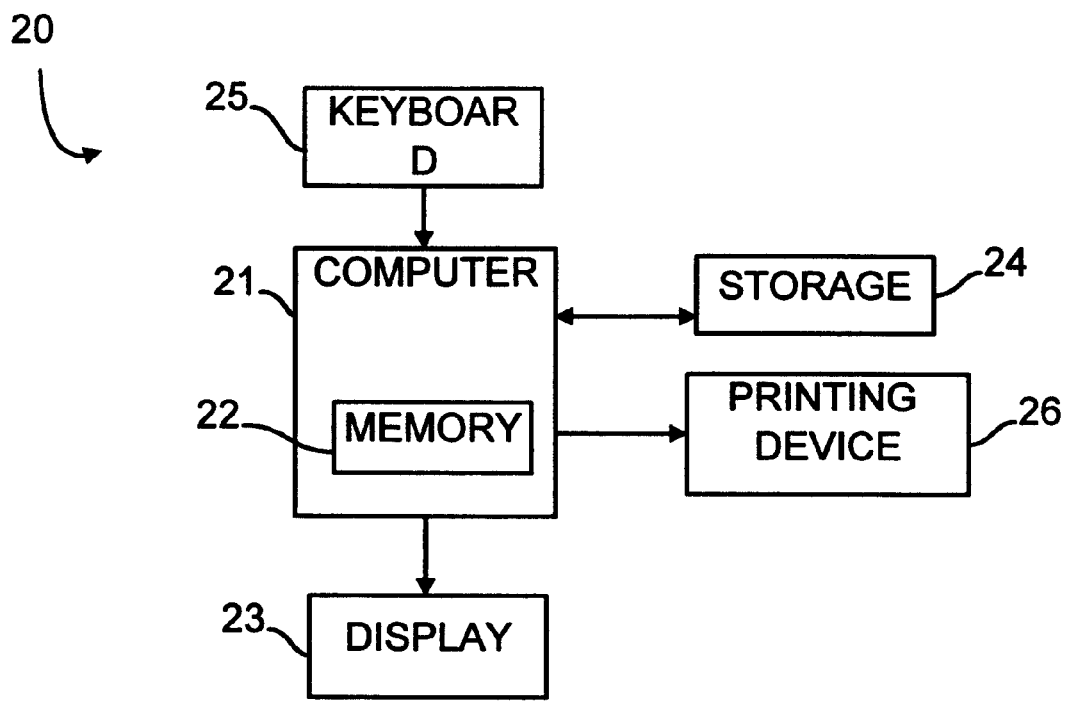
FIG. 2 is a block diagram of a system for use in building an induction tree.

A preferred method and device for analyzing collected data pertaining to printing attributes (particularly ink temperatures or ink temperature gains) to thereby identify correlations between one (or a combination of two or more) of these attributes and web breaks (or other problems) is discussed hereinafter. Referring now to FIG. 2, a system 20 that constructs induction trees for the purpose of identifying conditions leading to a particular result (e.g., web breaks) in a multi-variant system includes a computer 21 (which may be any type of processor) having a memory 22 therein. The computer 21, which may be integral with or a part of the controller 17 of FIG. 1, is connected to a display device 23 (such as a CRT) and to a data storage device 24 that stores data used by the computer 21. If desired, the storage device 24 may comprise a disk drive that alternatively or additionally allows a user to input data into the computer 21. An input device, such as a keyboard 25, allows a user to enter data and otherwise interact with the computer 21. A printing device 26 is attached to the computer 21 and is capable of printing induction trees developed by the computer 21 and/or other information, such as alarms, generated by the computer 21. Other input/output devices might alternatively or additionally be used.

Figure 3A:
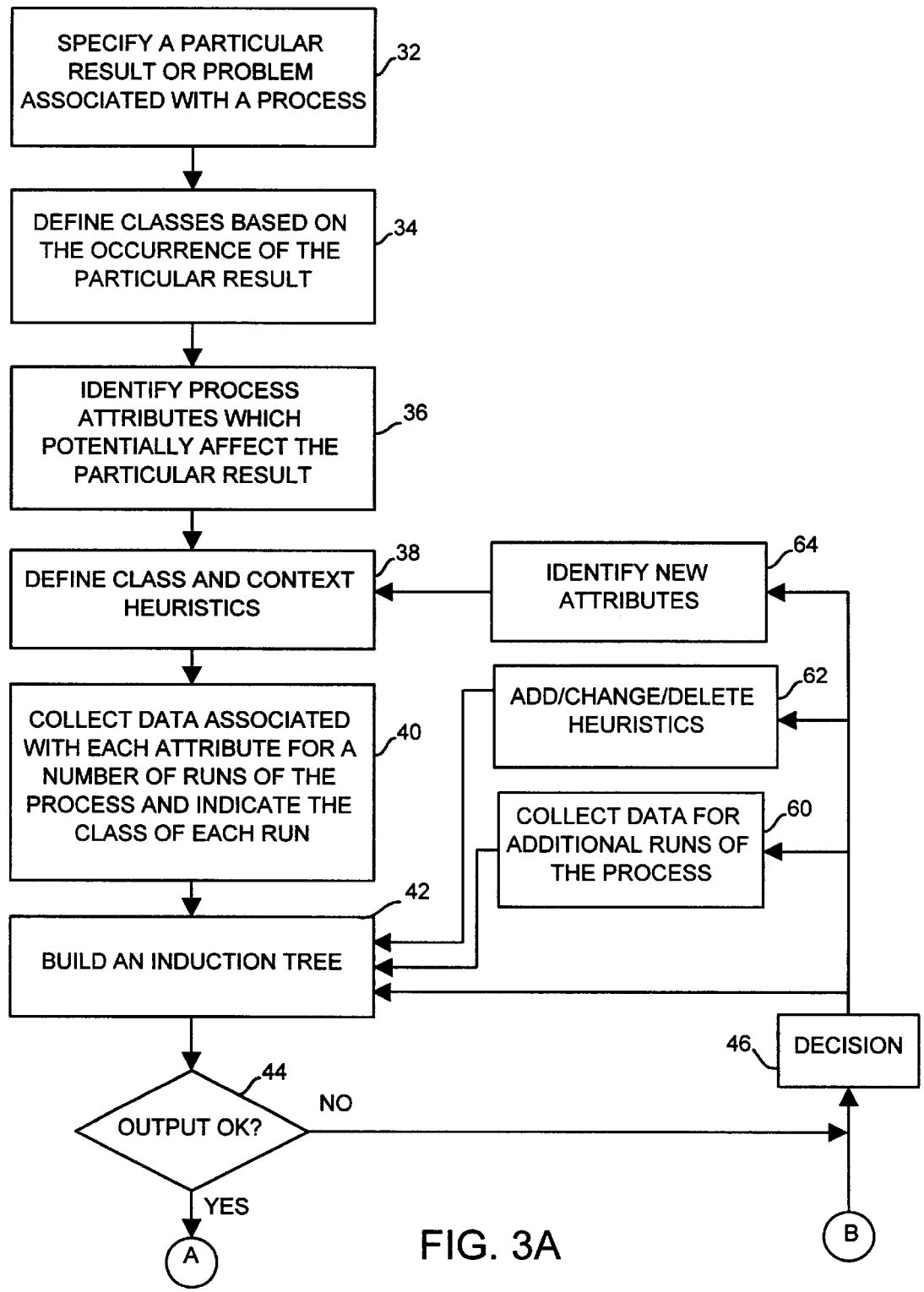
FIGS. 3A and 3B, when joined along similarly lettered lines, together form a flowchart of steps undertaken during a method of identifying conditions leading to a web break.
Figure 3B:
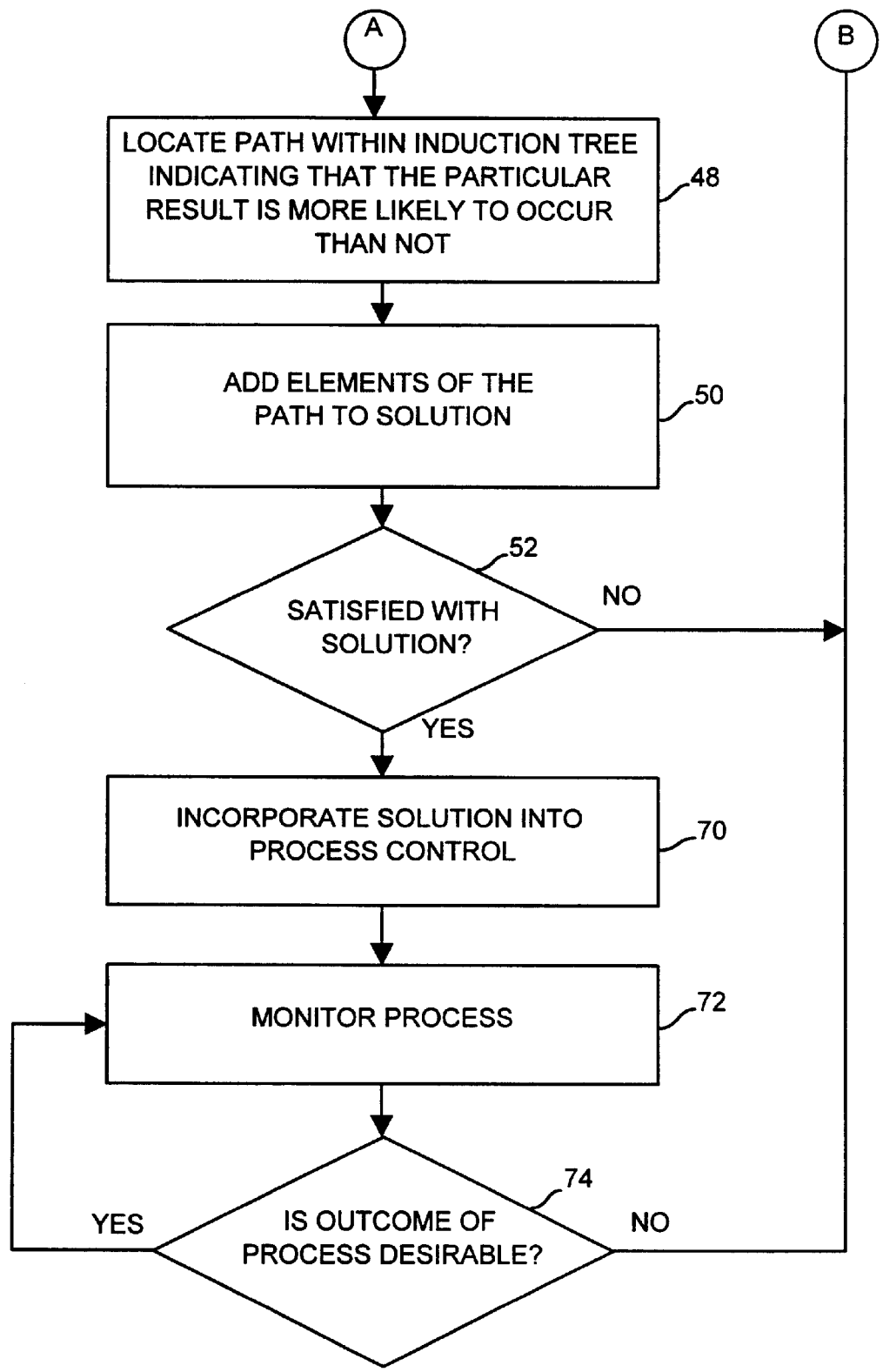

Referring now to FIGS. 3A and 3B, a flowchart illustrates a method that may be implemented in part by programming executed by the computer 21 (FIG. 2) that identifies conditions leading to a particular result, such as web breaks, in a printing system, that identifies ink temperature gain ranges associated with the decreased occurrence of web breaks in a printing system and/or that prescribes and implements a solution that decreases the probability of occurrence of, for example, web breaks in a printing system. Although the particular result described hereinafter (e.g., a web break) comprises an undesirable outcome of a process and the method is used to decrease the occurrence of the particular result, the particular result could instead comprise a desirable outcome or other desirable effect associated with the process (e.g., no web break) and the method could be used to increase the probability that the particular result will occur.

At the start of the method (step 32), a domain expert who is knowledgeable about a process specifies a particular result (such as a web break) associated with the process (e.g., a printing system). At a step 34, the domain expert defines classes associated with the particular result. Typically, the nonoccurrence of the particular result is associated with a first class and the occurrence of the particular result is associated with a second class.

At a step 36, the domain expert identifies attributes or features of the process that are potentially relevant to the occurrence of the particular result of the process. These attributes can be continuous, e.g., real valued, or discrete. If an attribute is discrete, the domain expert must identify the discrete values or categories that a value of the attribute can assume. For the case of web breaks, these attributes may include web manufacturing attributes, such as a mill site, a web making machine, a manufacturing date, a reel number, a reel set, a log position, one or more auxiliary web machines, a web tensile strength, a web moisture content and/or a coefficient of friction as well as printing attributes such as web tensions (e.g., reel tension, infeed tension, drag tension and ribbon tension), web tension ratios (e.g., infeed tension to reel tension, drag tension to infeed tension, ribbon tension to drag tension, etc.) and ink temperatures or ink temperature gains. Of course, other web manufacturing attributes and/or printing attributes may be used as well including, for example, ambient printing room conditions such as humidity, temperature, etc.

In order for the method to be ultimately successful in determining the cause of the particular result (such as a web break) or in prescribing a solution that increases or decreases the probability of the occurrence of the particular result, it may be important that all of the attributes that are actually relevant to the particular result be identified. If attributes that are actually relevant to the particular result are not identified at the step 36, the method may fail to determine the cause of the particular result or may produce an incomplete or inaccurate solution. However, identifying attributes that are not actually relevant to the occurrence of the particular result will not degrade the performance of the method or the solution ultimately obtained thereby.

At a step 38, the domain expert may identify class and context heuristics or rules associated with the attributes identified at the step 36. A class heuristic represents a known relationship between the distribution of classes and specific portions of the range of an attribute. A class heuristic preferably specifies that a particular range of an attribute should include a higher or lower proportion of attribute values that are associated with a particular one of the classes than any other range of the attribute. Class heuristics are used to prevent the method from searching for induction rules that are already known to be inaccurate in connection with the domain or the process.

A context heuristic represents an order of priority between two or more attributes. A context heuristic may, for example, specify that it is meaningless to search for induction rules associated with one of the identified attributes before searching for induction rules associated with a different one of the attributes. Thus, it may not make sense to search for an induction rule associated with a paper manufacturing machine before searching for one associated with a mill site. The attribute with the lower priority is said to be inactive within the context heuristics until the method has examined the attribute with the higher priority.

At a step 40, data or values are collected for each of the attributes for each of a number of runs of the process. This data may include values of ink temperature or ink temperature gain as identified above. A plurality of data records are then created, each of which includes values for the attributes identified at the step 36 along with the class associated with a particular run of the process. The plurality of records comprises a database that is used to develop induction rules associated with the process and that is stored within, for example, the storage device 24 of FIG. 2, preferably in text format. It is important that the values for the attributes are measured accurately. Inaccurate and/or incomplete data may lead to an inaccurate determination of the cause of the particular result or may lead to an inaccurate solution for increasing or decreasing the probability of the occurrence of the particular result. As a result, data preprocessing that, for example, replaces outliers (clearly inaccurate data), fills in missing data, eliminates records having incorrect or missing data, etc. may be performed to purify the data.

At a step 42, the records created at the step 40 are used to construct an induction tree. Preferably, at the step 42, the domain expert is allowed to guide the construction of the induction tree interactively. Each induction tree created at the step 42 indicates relationships between values of the attributes and the classes identified for the process (e.g., whether a web break or no web break occurred). An indication of the induction tree may be provided to a user via, for example, the printing device 26 or the display device 23 of FIG. 2.

At a step 44, the domain expert reviews the induction tree to determine whether the induction tree is satisfactory, i.e., whether any potentially relevant induction rules may be suggested thereby. If the induction tree is not satisfactory because, for example, no induction rules can be identified or the induction rules that are identified are not implementable in the process due to economic, social, quality or other reasons, the method proceeds to a decision step 46.

However, if the induction tree is satisfactory, the method proceeds to a step 48 of FIG. 3B at which the domain expert locates one or more paths within the induction tree that indicate that the particular result is more likely to occur than not. Conversely or in addition, the domain expert may also locate one or more paths within the induction tree that indicate that the particular result is less likely to occur than not. Each path identified by the expert may comprise one or more attribute values or ranges of attribute values associated with runs of the process that fall exclusively or almost exclusively into one of the classes defined at the step 34. Any particular induction tree may suggest any number of paths that lead to one or more components of a solution which, when used to control the process, will affect the probability of the occurrence of the particular result.

Rather than identifying induction rules manually by identifying such paths, the identification of induction rules can be performed automatically. A book written by J. R. Quinlan, *C4.5: Programs for Machine Learning* (*1991*), (in particular, chapters 5 and 9 and the appendix thereof), discloses a technique that automatically searches for and identifies induction rules within an induction tree. At a step 50, the components of the paths identified at the step 48 are added to a solution list, which may be stored in the memory 22 or the storage device 24 associated with the computer 21 of FIG. 2. Typically, different paths of either the same or different induction trees may identify different ranges of the same attribute as one of the solution components. If these ranges are not mutually exclusive, and where it is practical to do so, the domain expert preferably adopts the range included in all of the paths as the ultimate solution component. At a step 52, the domain expert determines whether the solution as compiled in the solution list is satisfactory. If the domain expert believes that the solution is not complete, the method proceeds to the decision step 46 of FIG. 3A.

At the step 46, the domain expert chooses one of a number of options in order to improve the quality of the induction tree constructed at the step 42 and to enhance the solution compiled at the step 50. Following the step 46, a new induction tree may be built at the step 42 with further input from the domain expert.

Alternatively, at the step 46, the method may proceed to a step 60 at which data is collected for additional runs of the process. The resulting additional records are added to the database used at the step 42 to build an induction tree. In this manner, a more complete or informative induction tree can be constructed at the step 42.

Also, at the step 46, the method may proceed to a step 62 wherein the domain expert changes, adds and/or deletes one or more of the class and/or context heuristics previously identified for the domain. This step is particularly useful when an induction tree indicates that the class heuristics previously identified are incorrect.

Alternatively, at the step 46, the method may proceed to a step 64 wherein the domain expert identifies additional attributes that may be relevant to the occurrence of the particular result but that were not previously identified. This step is particularly useful when the induction tree developed at the step 42 does not present any clear results. At the step 64, the domain expert can also delete attributes from the set of attributes previously identified when, for example, the expert believes that those attributes are not, in fact, relevant to the particular result. If at least one new attribute is identified at the step 64, the method returns to the step 38 at which class and context heuristics for the new or already identified attributes are defined. At the step 40, data for a new plurality of runs of the process are collected to produce records having data for all of the attributes, including the newly identified attribute(s).

When, at the step 52 of FIG. 3B, the expert is satisfied with the solution obtained at the step 50, the solution is incorporated into the process by running the process at a step 70 so that the process attributes have values within the ranges specified by the solution. For example, the ink temperatures within the printing system 5 of FIG. 1 may be controlled to keep the ink temperature gain at a particular value or within a range determined to be associated with a reduced occurrence of web breaks. At a step 72, the process is monitored during subsequent runs thereof and a determination is made at a step 74 whether the solution has been adequate in achieving a desired outcome, that is, eliminating or reducing the particular result (e.g., web breaks) from the process in an acceptable manner.

If the outcome of the process is desirable, the method returns to the step 72 which continues to monitor the outcome of the process. If, however, the outcome of the process is not desirable or if the outcome of the process returns to an undesirable condition during further monitoring of the process, the method returns to the step 46 of FIG. 3A at which the expert builds a new induction tree, collects additional data for the identified attributes, changes heuristics or identifies new attributes, all in an effort to generate a more complete or accurate solution, that is, to identify better ink temperature gain values or ranges and/or to identify other correlations between ink temperature gains and web breaks or other web problems.

Generally, the induction tree constructed at the step 42 has a root and any number of nodes that branch from either the root or from another node of the induction tree. The induction tree is constructed iteratively and performs the same operations at the root and each node using only data contained in records that are in a "current" database that has a content that varies with the position in the induction tree. At the root of the induction tree, the current database includes all of the records produced at the steps 40 and 60. The current database associated with any particular node of the induction tree includes a subset of the records of the database associated with the node (or root) from which the particular node branches.

Figure 4:
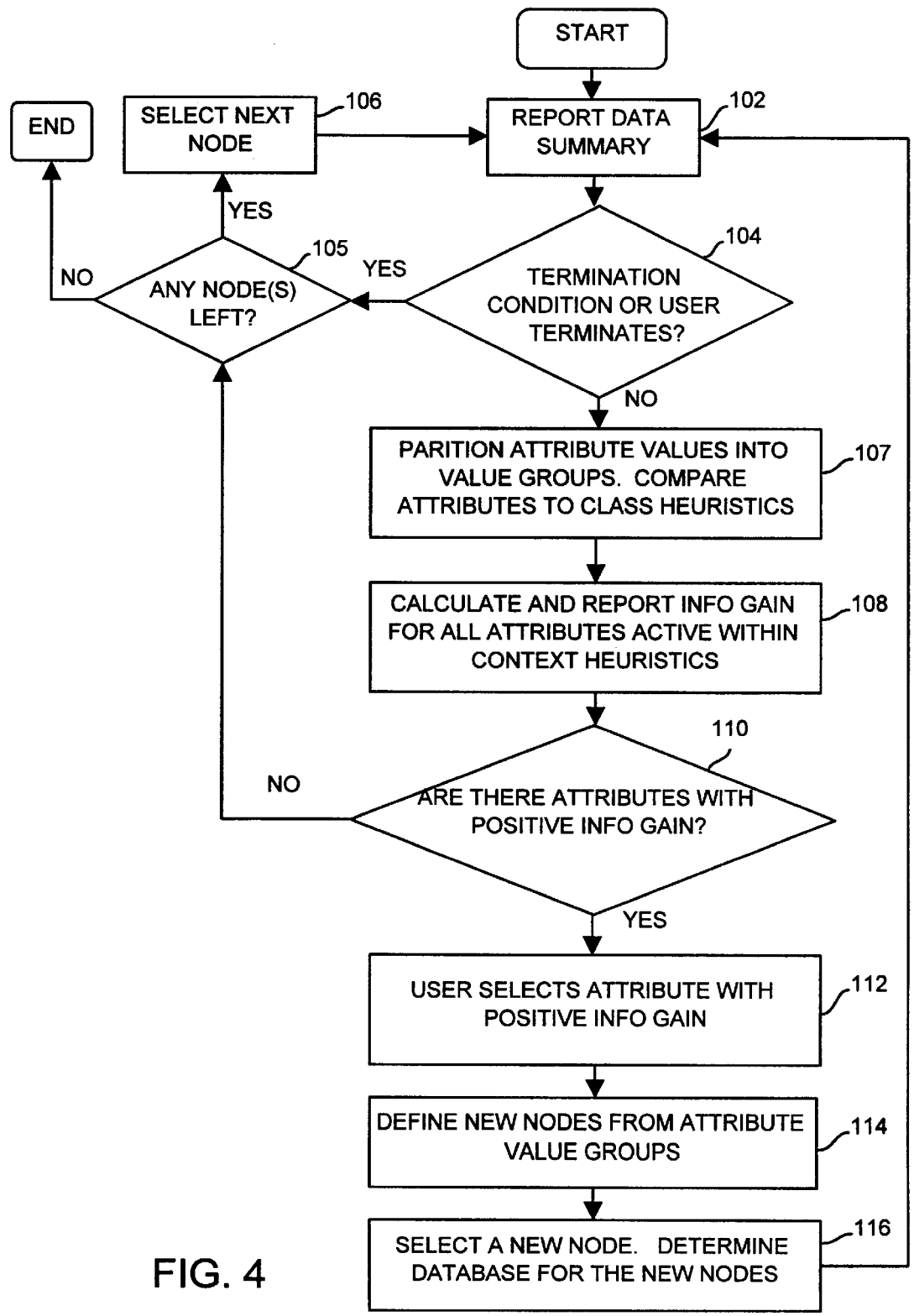
FIG. 4 is a flowchart of programming executed by the system of FIG. 2 for implementing a portion of the method identified by the flowchart of FIGS. 3A and 3B.

FIG. 4 illustrates a flowchart of programming, preferably in LISP (a commercially available programming language particularly suited for artificial intelligence applications), that is executed by the computer 21 to implement the step 42 of FIG. 3A. The programming begins at a block 102 which reports a summary of the records within the current database to the user via, for example, the display 23 of FIG. 2. Preferably, this summary indicates the number of records within the current database that are associated with each of the classes identified at the step 34 of FIG. 3A. The summary also identifies whether all of the records within the current database have the same value for any particular attribute and provides a characterization list that identifies the attributes for which that condition is satisfied. The summary may also list the values of one or more attributes and indicate the classes of the records having these values to provide the expert with more information about the records within the current database.

A block 104 then determines if a node termination condition is present. Preferably, a node termination condition exists if at least a predetermined percentage of the records within the current database are associated with the same class, in which case the node is labeled as an endpoint or a leaf of the induction tree. A node termination condition may also exist if all of the attributes active within the context heuristics have been selected as a branch within a path from the node to the root of the tree. Alternatively, a user can manually terminate the node using, for example, the keyboard 25 of FIG. 2 or another input device.

If a node termination condition exists, the block 104 terminates branching from the node and a block 105 determines if any unexamined nodes remain. If no unexamined nodes remain, the induction tree is complete and the program ends. If, however, all of the nodes have not been examined, a block 106 locates the next node, updates the current database to be that associated with the next node and returns control to the block 102. Alternatively, the block 106 can allow a user to select the next node to examine.

If the block 104 does not find a termination condition, a block 107 places each of the attributes in the characterization list into a context set identified for that node. The context set at each node is used to determine if an attribute is active within the context heuristics. The context set for a particular node (other than the root) includes: (1) the context set for the node from which the particular node branched (this node hereinafter referred to as the "previous node"); (2) any attribute identified in the characterization list by the block 102 for the particular node; and (3) the attribute chosen as the branch from the previous node to the particular node. The context set for the root of the induction tree contains only those attributes identified in the characterization list at the root of the induction tree.

The block 107 then partitions each active attribute into a finite number of value groups. Discrete attributes are partitioned into value groups according to discrete categories associated therewith. Real valued or continuous attributes are partitioned into value groups based on the actual values of that attribute within the current database and the classes associated with those values, as described hereinafter with respect to FIGS. 5A and 5B. The block 107 may also determine whether the actual distribution of the classes among the value groups is consistent with the class heuristics defined for the attributes. If the block 107 discovers an inconsistency between the actual distribution of the classes among the value groups of an attribute and the distribution specified in the class heuristic, that attribute is marked with a disagreement flag.

Next, a block 108 calculates a figure of merit, such as the normalized information gain value for each of the attributes active within the context heuristics, using the value groups developed by the block 107. The information gain value of an attribute is a measure of the distribution of the classes across the value groups of the attribute. The information gain value is defined such that a value of "1" indicates a complete or "perfect" correlation between the attribute value groups and the classes. In such a case, each attribute value group contains instances of only one class or is an empty set and, hence, the value groups completely discriminate the classes. Information gain values between "0" and "1" indicate less than complete correlation between the value groups and the classes, i.e., there is some distribution of classes among the value groups of the attribute. Information gain values close to "1" indicate a high correlation between the attribute value groups and the classes and information gain values close to "0" indicate a low correlation between the attribute value groups and the classes. An information gain value of "0" indicates that no correlation between the attribute value groups and the classes exists and thus, that the classes are randomly distributed throughout the value groups of the attribute. In such a case, the distribution of the classes is not affected by the selection of the attribute and so, selection of the attribute at the node would not be particularly helpful.

Preferably, the information gain value IG(A) of an attribute A is calculated as follows:

$$IG(a) = I(p, n) - E(A) \quad (1)$$

$$\text{wherein: } I(p, n) = -\frac{p}{p+n}\log_2\frac{p}{p+n} - \frac{n}{p+n}\log_2\frac{n}{p+n} \quad \text{and} \quad (2)$$

$$E(A) = \text{Expected value of attribute } A \quad (3)$$

$$= \sum_{i=1}^{vg} \frac{p_i + n_i}{p+n} \cdot I(p_i, n_i)$$

where:

$p$ = Number of records within the current database associated with the first class; and $n$ = Number of records within the current database associated with the second class;

and where:

$vg$ = Total number of value groups associated with attribute $A$;

$p_i$ = Number of records within the current database that are associated with the value group $i$ of attribute $A$ and that are associated with the first class;

$n_i$ = Number of records within the current database that are associated with the value group $i$ of attribute $A$ and that are associated with the second class; and $I(p_i, n_i) = I(p, n)$ calculated for $p = p_i$ and $n = n_i$;

Although the information gain value IG(A) is useful, it is biased toward those attributes that have a greater total number of value groups. Thus, an attribute having two value groups each with an equal probability of having a particular class associated therewith will have an information gain value that is less than the information gain value of an attribute having six value groups each with an equal probability of having a particular class associated therewith. To correct this bias, the following normalizing information gain value NG(A) for attribute A is calculated by the block 108:

$$NG(A) = \frac{IG(A)}{NF(A)} \quad \text{where:} \quad (4)$$

$$NF(A) = -\sum_{i=1}^{vg} \left[ \frac{p_i}{p_i + n_i}\log_2\frac{p_i}{p_i + n_i} + \frac{n_i}{p_i + n_i}\log_2\frac{n_i}{p_i + n_i} \right] \quad (5)$$

Next, a block 110 determines if any of the attributes active within the context heuristics have positive normalized information gain values. If none of the attributes has a positive normalized information gain value, the block 110 terminates further branching from the node and control passes to the blocks 105 and 106 which select the next node to be examined. If, however, one or more of the attributes have a positive normalized information gain value, a block 112 presents each of the attributes active within the context heuristics and the normalized information gain value associated therewith to the expert via the display 23 of FIG. 2.

Preferably, the attributes are ranked according to the normalized information gain values associated therewith. Such ranking may include the categories of: BEST, for the attribute having the highest normalized information gain value; HIGHLY USEFUL, for attributes having a normalized information gain value at least 95 percent of the highest normalized information gain value; USEFUL, for attributes having a normalized information gain value between 90 and 95 percent of the highest normalized information gain value; MARGINAL, for attributes having a normalized information gain value between 75 and 90 percent of the highest normalized information gain value; QUESTIONABLE, for attributes having a normalized information gain value between 50 and 75 percent of the highest normalized information gain value; LAST RESORT, for attributes having a normalized information gain value above zero but below 50 percent of the highest normalized information gain value; and USELESS, for attributes having a normalized information gain value of substantially zero. Any other desired categories can be alternatively or additionally used.

Preferably, any attribute that has been marked by the block 107 as having a distribution of classes among its value groups that is inconsistent with a class heuristic is identified as such by, for example, placing brackets around the displayed normalized information gain value of that attribute. Alternatively, the normalized information gain value of any such attribute can be set to zero.

The block 112 then permits selection of one of the attributes as a branch within the induction tree. Preferably, the block 112 allows the domain expert to interactively select one of the attributes that, also preferably, has a positive normalized information gain value. It is important to note, however, that the expert need not select the attribute having the highest normalized information gain value, but can select any of the attributes active within the context heuristics according to any desired criteria. Alternatively, the block 112 can automatically select one of the attributes and, in such a case, preferably selects the attribute with the highest normalized information gain value. However, automatic selection of an attribute may lead to a less complete or desirable solution.

A block 114 causes branching on the chosen attribute such that new nodes are created within the induction tree, each of which corresponds to a value group of the chosen attribute. A block 116 permits a user to interactively terminate or to select each of the new nodes for examination, defines a new current database for each selected node and places the selected attribute into the context set for that node. The new current database includes all of the records within the database of the previous node having values associated with the value group of the new node.

When one of the nodes has been selected, the block 116 stores an indication of the other nodes that were created by the block 114 and an indication of the databases and the context sets associated with those nodes for future examination in, for example, the data storage unit 24 of FIG. 2. The block 116 then returns to the block 102 which begins an iteration for the new node.

Figure 5A:
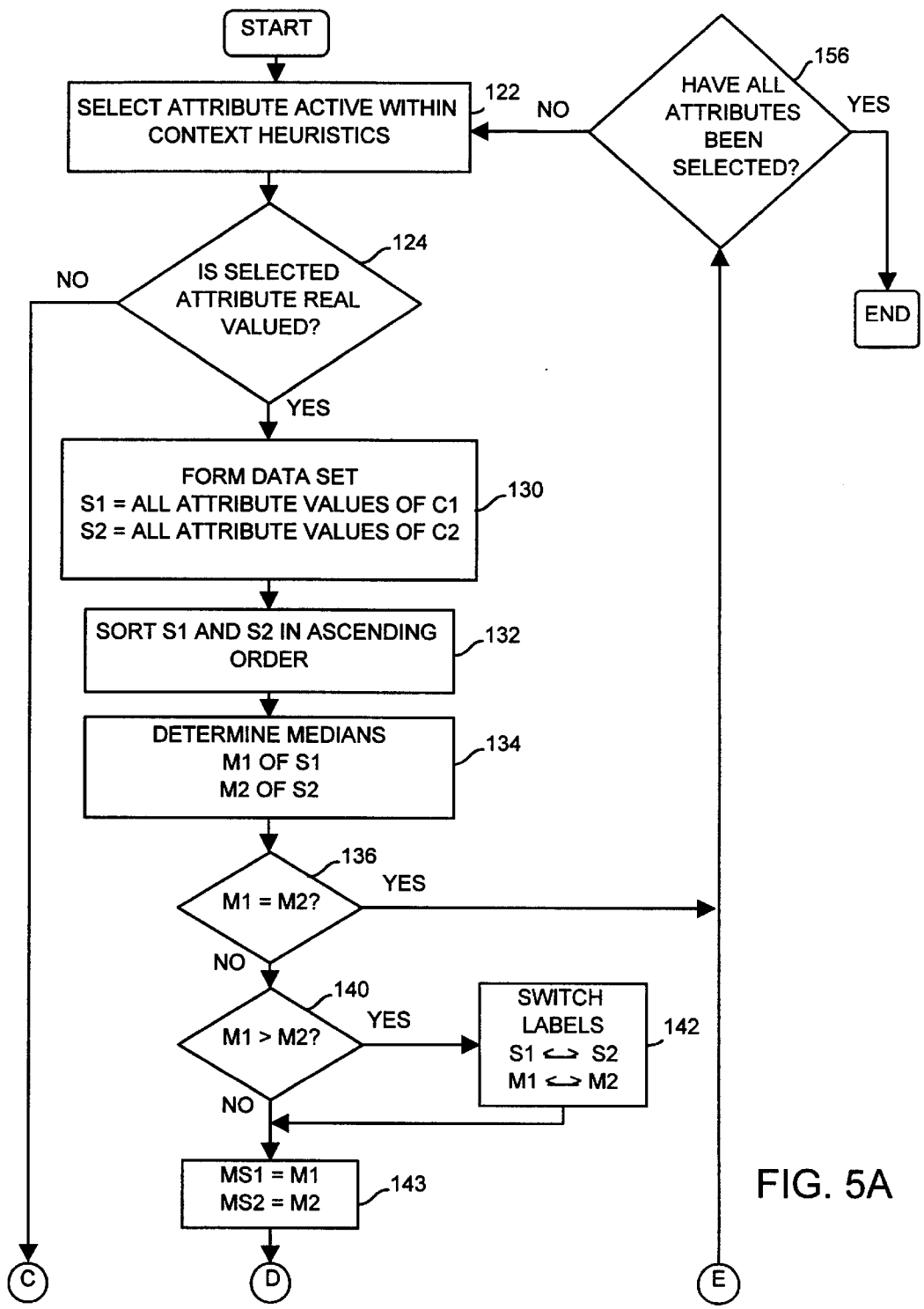
FIGS. 5A and 5B, when joined along similarly lettered lines, together form a flowchart of programming for implementing a block of FIG. 4.
Figure 5B:
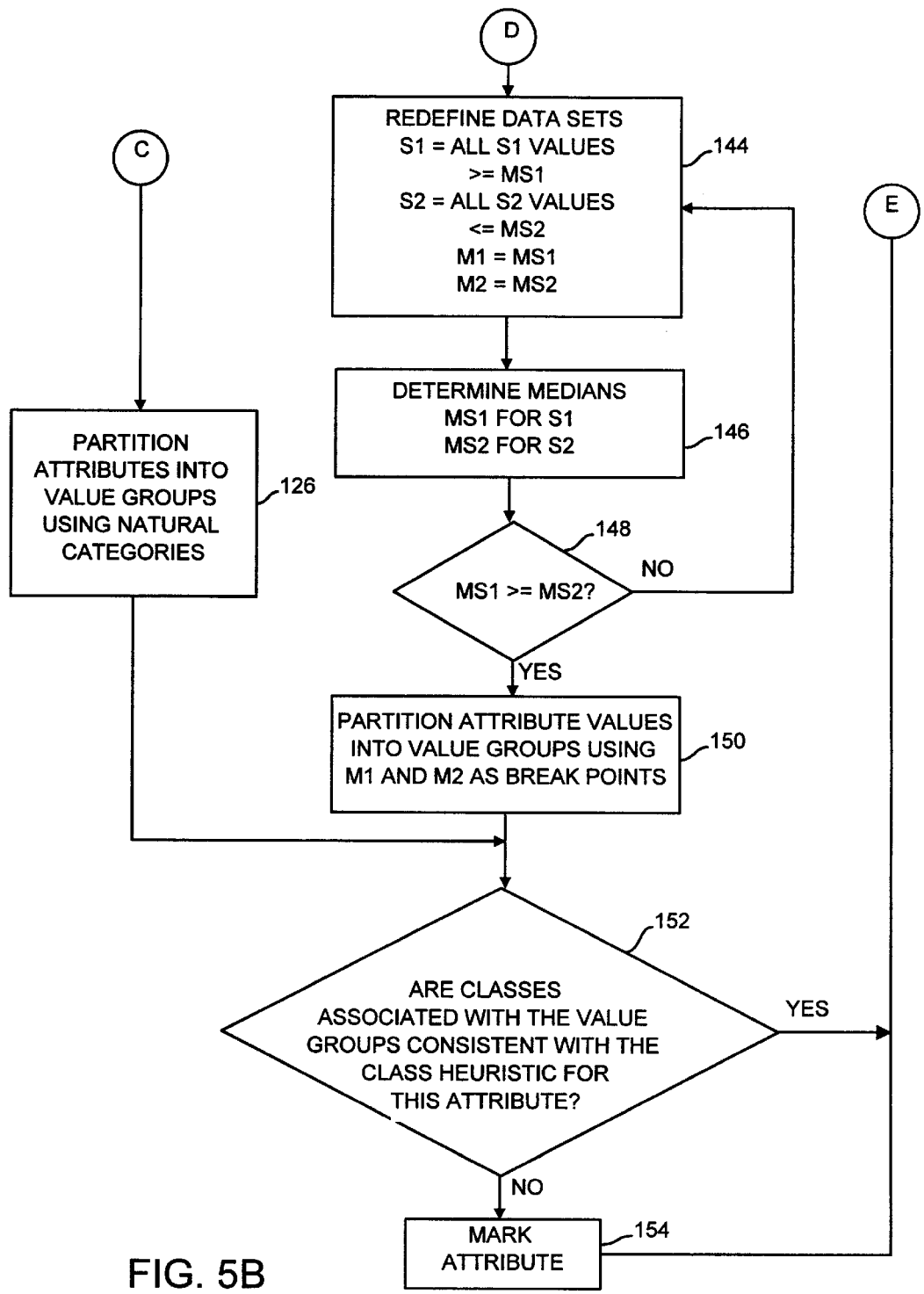

Referring now to FIGS. 5A and 5B, the operation of the block 107 of FIG. 4 will be described in detail. A block 122 selects a present attribute and determines whether the present attribute is active within the context heuristics. In doing so, the block 122 compares the context set for the node with a context list associated with the present attribute. The context list associated with the present attribute identifies those attributes that must be branched upon in the induction tree before the present attribute can become active. If all of the attributes within the context list associated with the present attribute are also within the context set of the node being examined, the present attribute is deemed to be active. If the present attribute has an empty context list it is always active within the context heuristics.

A block 124 then determines if the present attribute is real valued. If not, then the present attribute is a discrete valued attribute and a block 126 of FIG. 5B partitions the present attribute into value groups based on the categories associated with the present attribute that have been previously defined by the domain expert.

If the block 124 determines that the present attribute is real valued, a block 130 forms two data sets S1 and S2 from the values of the present attribute. The data set S1 includes all of the values of the present attribute in records within the current database associated the first class. The data set S2 includes all of the values of the present attribute in records within the current database associated with the second class.

A block 132 sorts all of the values within each of the data sets S1 and S2 in ascending order and a block 134 determines the medians M1 and M2 for the data sets S1 and S2, respectively. A block 136 determines whether the medians M1 and M2 are equal and, if so, the present attribute cannot be partitioned. Control is then passed to a block 156 and, as a result, the present attribute will only have one value group and the normalized information gain value associated therewith will be zero.

If, on the other hand, the medians M1 and M2 are not equal to one another, a block 140 tests to determine if the median M1 is greater than the median M2. If so, a block 142 relabels the data set S1 as data set S2 and the median M1 as median M2 and, simultaneously, relabels the data set S2 as data set S1 and the median M2 as median M1. Furthermore, the block 142 stores a class flag that indicates that the data sets S1 and S2 have been relabeled.

Next, a block 143 sets median values MS1 and MS2 equal to medians M1 and M2, respectively. A block 144 of FIG. 5B redefines the data set S1 to include only the values within the data set S1 that are greater than or equal to the median MS1. The block 144 also redefines the data set S2 to include only the values within the data set S2 which are less than or equal to the median MS2. Furthermore, the block 144 sets the medians M1 and M2 equal to the medians MS1 and MS2, respectively. A block 146 then determines the medians MS1 and MS2 of the new data sets S1 and S2, respectively. Next, a block 148 determines whether the median MS1 is greater than or equal to the median MS2 and, if not, control returns to the block 144 which redefines the data sets S1 and S2.

The blocks 144, 146 and 148 are re-executed until the block 148 determines that the median MS1 is greater than or equal to the median MS2. When this condition occurs, a block 150 partitions the selected real valued attribute into three value groups. The first value group includes all of those attribute values associated with records within the current database that are less than or equal to M1. The second value group includes all of those attribute values associated with records within the current database that are greater than M1 and less than M2. The third value group includes all of those attribute values associated with records within the current database that are greater than or equal to M2. If desired, additional value groups can be defined by ranges at the upper and/or lower ends of the attribute value continuum that are associated exclusively with one class.

Although the blocks 134 and 146 are described herein as determining the medians of the sets S1 and S2, any other desired statistical properties of the sets S1 and S2, including the means thereof, could instead be determined and used in the method illustrated in the flowchart of FIGS. 5A and 5B. It should be noted that the above-described method of partitioning real valued attributes is computationally simple and inexpensive and, therefore, can be applied at every node of the induction tree that is labeled as a branching point. If desired, a real-valued attribute may be checked to see if it has a windowed characterstic wherein one of the classes associated with the attribute is windowed by the other class. This procedure is described in the patent application, Ser. No. 09/026,267 filed on Feb. 19, 1998, by Evans and is assigned to the assignee of the present invention, the disclosure of which is hereby expressly incorporated by reference herein.

A block 152 determines whether the distribution of the classes among the value groups developed by the blocks 126 and 150 is consistent with any class heuristics previously identified at the steps 38 or 62 of FIG. 3A. For real valued attributes, it is assumed that the first class is associated with the data set S1, meaning that proportionately more of the values within the data set S1 are associated with the first class than are associated with the second class. Likewise it is assumed that the second class is associated with the data set S2 such that proportionately more of the values within the data set S2 are associated with the second class than are associated with the first class. If, however, the class flag indicates that the data sets S1 and S2 have been relabeled during the discretization process, it is assumed that the first class is associated with the data set S2 and that the second class is associated with the data set S1.

With respect to real valued attributes, the block 152 determines if the class associated with the data set S1 or S2, as defined by the class flag, is consistent with the class heuristic. If so, the distribution of classes is said to be consistent with the class heuristic wherein the latter indicates whether higher or lower values of an attribute are expected to be associated with one of the classes. A class associated with the data set S1 is consistent with a class heuristic that indicates that lower values of the attribute are more likely to be associated with the class than higher values. Likewise a class associated with the data set S2 is consistent with a class heuristic that indicates that higher values of the attribute are more likely to be associated with the class than lower values of the attribute.

Preferably, for discrete valued attributes, a class heuristic indicates a value or a value group of the attribute and the class that should be predominantly associated with that value group. Thus, for discrete valued attributes, the block 152 determines whether there is a higher or lower percentage of a class within the value group defined by the class heuristic than the percentage of that class in any other range of the attribute. For example, if the class heuristic identifies that one value group is more likely to be associated with the first class, the block 152 compares the percentage of values in the one value group that are associated with the first class to the percentage of the values of that attribute associated with the first class in each of the other value groups. If the percentage of values associated with the first class is highest in the one value group, the distribution of classes among the value groups is consistent with the class heuristic.

If the block 152 determines that the distribution of classes predominantly associated with the value groups of the attribute is inconsistent with the class heuristic identified for the attribute, a block 154 marks the attribute with a disagreement flag.

After the attribute has been marked by the block 154 or, if the block 152 does not detect an inconsistency between the distribution of the classes of the values within the value groups of the attribute and a class heuristic defined for the attribute, the block 156 of FIG. 5A determines if all of the attributes that are active within the context heuristics have been selected. If so, the method proceeds to the block 108 of FIG. 4. Otherwise, the block 122 selects the next attribute for partitioning.

Figure 6A:
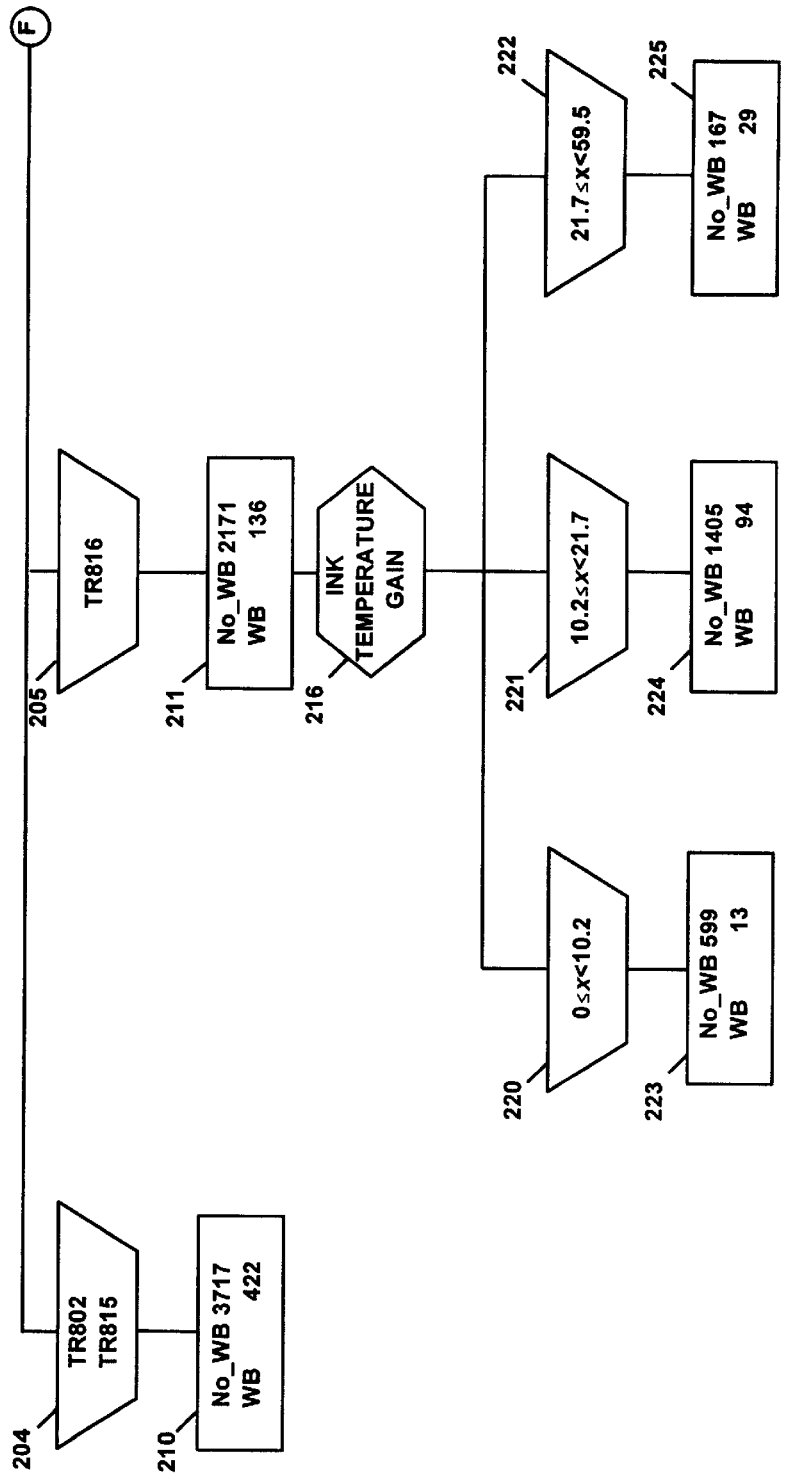
FIGS. 6A, 6B and 6C, when joined along similarly lettered lines, together form a representation of an induction tree constructed to identify conditions leading to web breaks in a rotogravure printing process.
Figure 6B:
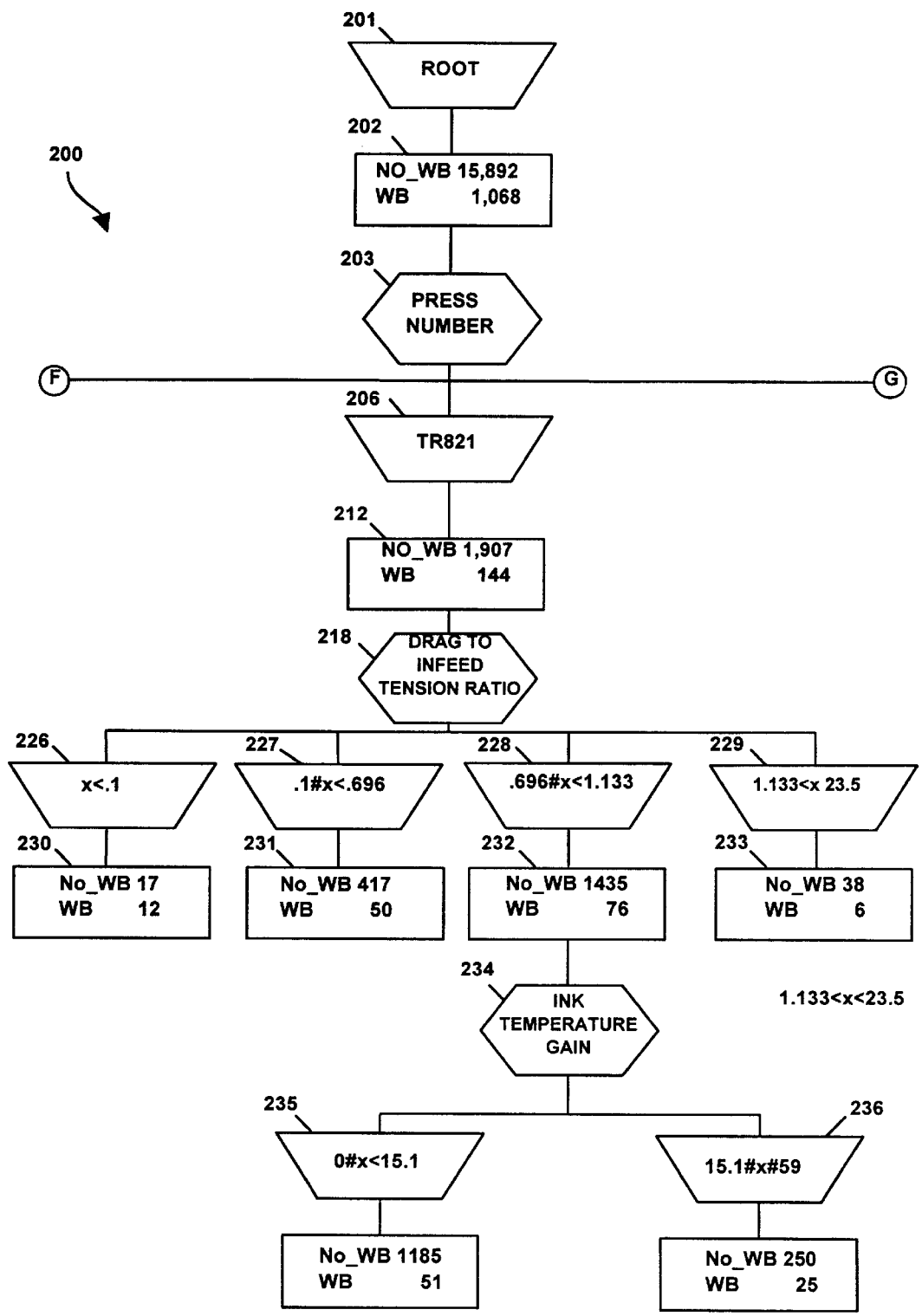
Figure 6C:
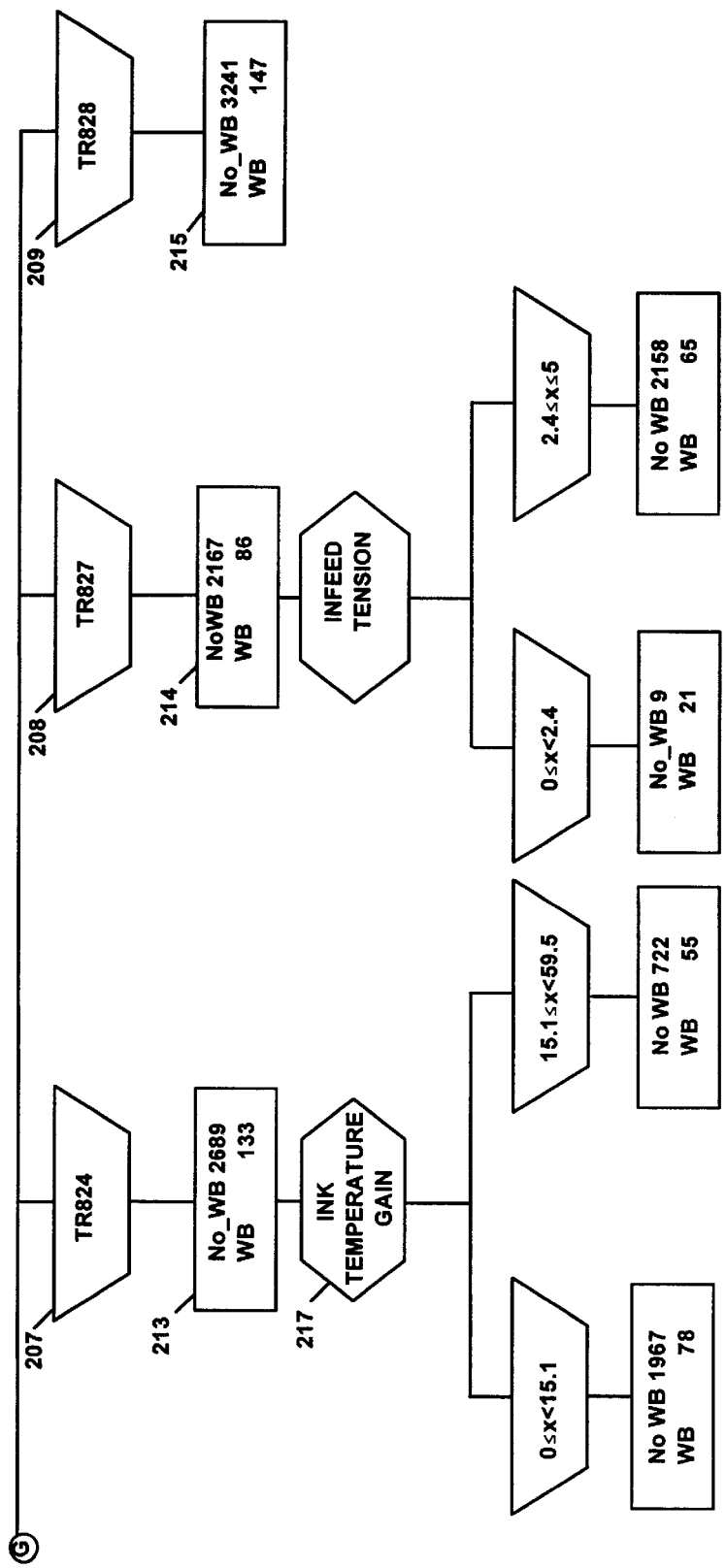

Referring now to FIGS. 6A, 6B and 6C which, when joined along similarly lettered lines, form an exemplary induction tree 200 illustrating the operation of the above-described decision-tree induction method for the case in which data have been collected and stored for ink temperature gain. The induction tree 200 of FIGS. 6A–6C is representative of data from a printing run on a standard printing system 5, as shown in FIG. 1, wherein ink fountains 16a–16e and 16f–16j are used. The induction tree 200 includes a root node 201 (FIG. 6B) and a root summary box 202 that indicates of the 16,960 records within the current database at the root, 15,892 of the records are associated with the no web break (No_WB) class, while 1,068 of the records are associated with the web break (WD) class. At the time that the induction tree 200 was constructed, the normalized information gain values were computed for each attribute active within the context heuristics and the user was presented with a list of the attributes active within the context heuristics and the normalized information gain values associated therewith. In the case shown in FIGS. 6A–6C, the user chose the attribute Press Number as a first branch 203 of the induction tree 200. The attribute Press Number was refined into six different values based on the presses that provided the data for the induction tree 200. Specifically, TR802 and TR815, TR816, TR821, TR824, TR827, and TR828 press value nodes are represented by reference numerals 204, 205, 206, 207, 208, and 209, respectively. Each press value node 204–209 has an associated summary box 210–215 that indicates the number of records that are associated with the No_WB class and the number of records associated with the WB class.

Each of presses TR816, TR821, TR824, and TR827 have branches that are used to further break down the records. For example, presses TR816 (FIG. 6A) and TR824 (FIG. 6C) contain Ink Temperature Gain branches 216 and 217, respectively. Press TR821 contains a Drag to Infeed Tension Ratio branch 218 and press TR827 contains an Infeed Tension branch 219.

Referring now in detail to the Ink Temperature Gain branch 216, ink temperature gain is real valued and refined into three ranges (identified as nodes 220, 221 and 222) using a real valued discretizing routine such as any known or desired routine. As illustrated in FIG. 6A, the node 220 is associated with the ink temperature gain range between 0 and 10.2 degrees, the node 221 is associated with the ink temperature gain range of less than 21.7 degrees and greater than or equal to 10.2 degrees and the node 222 is associated with the ink temperature gain range of greater than or equal to 21.7 degrees and less than or equal to 59.5 degrees.

At the node 220, the current database included 612 records, comprising the records within the database at the Ink Temperature Gain branch 216 having an ink temperature gain value less than 10.2 degrees. A summary box 223 indicates that 599 of these records were associated with No_WB class and that 13 of these records were associated with the WB class. A summary box 224 indicates that of the 1499 records having an ink temperature gain between 10.2 and 21.7 degrees, 1,405 were associated with the No_WB class and 94 were associated with the WB class. Similarly, a summary box 225 indicates that of the 196 records having an ink temperature gain between 21.7 and 59.5 degrees, 167 were associated with the No_WB class and 29 were associated with the WB class. Although the preceding discussion addresses the details of branch 216, the same discussion may be generalized to apply to branch 217, which also refines records through the use of various nodes indicating ranges of ink temperature gain.

The information at the Drag to Infeed Tension Ratio branch 218 is refined into four ranges represented by nodes 226–229. Specifically, node 226 is associated with a tension ratio less than 0.1, node 227 is associated with a tension ratio greater than or equal to 0.1 and less than 0.696, node 228 is associated with a tension ratio greater than or equal to 0.696 and less than 1.133 and node 229 is associated with a tension ratio greater than or equal to 1.133 and less than or equal to 23.5. Associated with each node 226–229 is a summary box 230–233 that reports the number of records associated with the No_WB class and the number of records associated with the WB class.

Of particular interest is summary box 232, which reports that of the 1,511 records in the 0.696 to 1.133 range, 1,435 were associated with the No_WB class and 76 were associated with the WB class. An Ink Temperature Gain branch 234 is used to further refine the data reported by summary box 232. Like the Ink Temperature Gain branch 216, the Ink Temperature Gain branch 234 refines records according to ink temperature gain ranges represented by nodes 235 and 236. These nodes represent ink temperature gains from 0 to 15.1 and 15.1 to 59, respectively. Each node 235, 236 has an associated summary box that reports the number of records associated with the WB class and the number of records associated with the No_WB class. For this branch of the tree, it can be seen that, when the infeed tension ratio is between 0.696 and 1.113, it is best to keep ink temperature gain below about 15 degrees and that an ink temperature gain above about 15.1 degrees gives a drastic increase in web breaks (10%).

Thus, based on this branch of the induction tree 200, it may be seen that an ink temperature gain of approximately (i.e., within the range of) 0 to 10.2 degrees is appropriate for reducing the occurrence of web breaks in the printing system for which the ink temperature data were collected. Also, using an ink temperature gain above 21.7 degrees may result in a drastic increase in web breaks and this ink temperature gain range should, therefore, be avoided. It is important to note that the ranges of ink temperature gain that lead to increases or decreases in web breaks will vary based on the paper that is used in the printing system.

Based on the above results, the operator of, or a controller (e.g., the controller 17 of FIG. 1) connected to, the printing system for which the data was collected may keep the ink temperature gain between 0 and 10.2 degrees to reduce the occurrence of web breaks. Thus, if the ink temperature of one ink fountain increases for some reason, the ink temperature of subsequent ink fountains should also be increased to keep the ink temperature gain at between 0 and 10.2 degrees. Alternatively, an ink chiller can be used to cool the temperature of the ink that has increased in temperature.

Of course other induction trees can be produced to determine other correlations between one or more other printing attributes (such as web tensions). In some cases, different values or ranges for the same ink temperature gain may be determined. In these cases, the different values or ranges may be combined into a single range or, alternatively, a single "best" value or range may be determined from the different values or ranges in any desired manner (e.g., averaging). Furthermore, if desired, other types of analyses could be performed to determine correlations between one or more printing attributes and the occurrence of web breaks or other problems in a printing system and to determine appropriate ink temperatures or ink temperature gains for decreasing the occurrence of web breaks in a printing system. Other such systems include, but are not limited to, standard correlation analyses, neural networks, fuzzy logic systems, or any expert system that stores and uses data pertaining to one or more such attributes for printing runs in which the problem occurred and for printing runs in which the problem did not occur. The commercial software product known as KnowledgeSEEKER (manufactured by Angoss Software International Limited) is one such expert system.

Of course, when determining an appropriate ink temperature gain range, the system preforming the correlation analysis may store data indicating the ink temperatures at particular web locations and use this data to determine an appropriate ink temperature gain range as, for example, described above and illustrated in FIGS. 6A–6C. In some cases, the correlation analysis may also use, for example, appropriate software to calculate ink temperature gains from the stored ink temperature data and to determine correlations between these calculated ink temperature gains and web breaks. Alternatively, the database may store ink temperature gains directly and these ink temperature gains may be used to determine one or more appropriate ink temperature gain values and/or ranges.

While the present invention is specifically described herein for the purpose of identifying the causes of and reducing the occurrence of web breaks in a printing system that prints on a paper web, the attributes and methods described herein may be equally used to identify the causes of and to decrease the occurrence of web breaks in any other types of printing systems including, for example, those which print on fabric webs, wallpaper webs, linoleum webs, sheet metal webs, etc. Likewise, the same attributes and methods described herein may be used to identify the causes of and to reduce the occurrence of other problems within a printing system including, for example, web defects.

Numerous modifications and alternative embodiments of the invention will be apparent to those skilled in the art in view of the foregoing description. Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

It is claimed:

1. A device for determining conditions under which a break in a web of a printing system having a multiplicity of ink fountains is more likely to occur, comprising:
    a database that stores data related to temperatures of ink in a first and a second of the multiplicity of ink fountains for each of a plurality of printing runs of the printing system, wherein a web break occurred in some of the plurality of printing runs and did not occur in others of the plurality of printing runs; and
    a processor that determines if there is a correlation between the stored data and the occurrence of web breaks in the printing system.

2. The device of claim 1, wherein the data comprise an ink temperature gain associated with the first and second ink fountains.

3. The device of claim 1, wherein the data comprise ink temperature.

4. The device of claim 1, wherein the processor implements a decision-tree induction algorithm to create an induction tree using the data.

5. The device of claim 1, further including an output device that displays the correlation between the data and the occurrence of a web break when the correlation is determined.

6. The device of claim 1, wherein the processor determines first and second ink temperature gain values, wherein web breaks are less likely to occur at the first ink temperature gain value than the second ink temperature gain value.

7. The device of claim 1, wherein the processor determines first and second ink temperature gain values, wherein web breaks are less likely to occur at the first ink temperature gain value than the second ink temperature gain value.

8. A method for use in detecting the occurrence of a problem in a web of a printing system, comprising the steps of:
    collecting data related to an ink temperature in at least two ink fountains for each of a plurality of printing runs of the printing system, wherein the web problem occurred during some of the plurality of printing runs and did not occur during others of the plurality of printing runs; and
    determining if the data related to ink temperature is correlated with the occurrence of the web problem during the plurality of printing runs.

9. The method of claim 8, wherein the determining step includes the step of developing an induction tree to determine the manner in which the data related to ink temperature are correlated with the occurrence of the web problem.

10. The method of claim 8, wherein the determining step includes determining first and second ink temperature gain values, wherein web breaks are less likely to occur at the first ink temperature gain value than the second ink temperature gain value.

11. The method of claim 8, wherein the determining step includes determining first and second ink temperature gain ranges, wherein web breaks are less likely to occur at the first ink temperature gain range than the second ink temperature gain range.

12. The method of claim 8, wherein the web problem is a web break.

13. A method for use in a printing system, comprising:
    measuring a first ink temperature of a first ink in a first ink fountain of the printing system;
    measuring a second ink temperature of a second ink in a second ink fountain of the printing system;
    comparing the first ink temperature to the second ink temperature to determine an ink temperature gain;
    comparing the ink temperature gain to a desired ink temperature gain range; and
    generating an output signal based on the step of comparing the ink temperature gain to the desired ink temperature gain range.

14. The method of claim 13, wherein the output signal comprises an alarm signal that generates an alarm when the ink temperature gain is not within the desired ink temperature gain range.

15. The method of claim 14, wherein the alarm comprises a visible alarm.

16. The method of claim 14, wherein the alarm comprises an audible alarm.

17. The method of claim 13, wherein the acceptable range of ink temperature gain comprises zero to 15 degrees.

18. The method of claim 13, wherein the output signal comprises a control signal that is used to change the temperature of the first ink in the first ink fountain or the temperature of the second ink in the second ink fountain to drive the ink temperature gain to be within the desired ink temperature gain range to thereby reduce web breaks in the printing system.

19. The method of claim 18, wherein the desired ink temperature gain range is a single gain value.

20. The method of claim 18, wherein the output signal is coupled to an ink cooler.

21. The method of claim 18, wherein the output signal is coupled to an ink heater.

22. A system for reducing web breaks in a printing system having a multiplicity of ink fountains, comprising:
- a first temperature sensor that measures a first ink temperature of a first ink in a first ink fountain of the printing system;
- a second temperature sensor that measures a second ink temperature of a second ink in a second ink fountain of the printing system; and
- a controller that compares the first ink temperature to the second ink temperature to determine an ink temperature gain, that compares the ink temperature gain to a desired ink temperature gain range and that generates an output signal based on the comparison of the ink temperature gain and the desired ink temperature gain range.

23. The system of claim 22, wherein the output signal comprises an alarm signal that generates an alarm when the ink temperature gain is not within the desired ink temperature gain range.

24. The system of claim 23, wherein the alarm comprises a visible alarm.

25. The system of claim 23, wherein the alarm comprises an audible alarm.

26. The system of claim 22, wherein the acceptable range of ink temperature gain comprises zero to 15 degrees.

27. The system of claim 22, wherein the output signal comprises a control signal that is used to change the temperature of the first ink in the first ink fountain or the temperature of the second ink in the second ink fountain to drive the ink temperature gain to be within the desired ink temperature gain range to thereby reduce web breaks in the printing system.

28. The system of claim 22, wherein the desired ink temperature gain range is a single gain value.

29. The system of claim 22, wherein the output signal is coupled to an ink cooler.

30. The system of claim 22, wherein the output signal is coupled to an ink heater.

* * * * *